(12) United States Patent
Lang

(10) Patent No.: US 6,588,146 B1
(45) Date of Patent: Jul. 8, 2003

(54) WINDOW GREENHOUSE WITH CONTOURED SURFACES

(76) Inventor: Richard A. Lang, 3421 Woodview Dr., Lafayette, CA (US) 94549

( * ) Notice: Subject to any disclaimer, the term of this patent is extended or adjusted under 35 U.S.C. 154(b) by 32 days.

(21) Appl. No.: 09/865,933

(22) Filed: May 23, 2001

Related U.S. Application Data

(60) Provisional application No. 60/207,888, filed on May 25, 2000.

(51) Int. Cl.[7] .................................................. A47G 7/00
(52) U.S. Cl. .......................................................... 47/40
(58) Field of Search ............................ 47/40; D11/145; 232/43.1; 52/36, 73, 211; D6/300; D25/119; 403/205

(56) References Cited

U.S. PATENT DOCUMENTS

| | | | | |
|---|---|---|---|---|
| 3,728,833 A | * | 4/1973 | Grossman | 52/211 |
| 4,038,791 A | * | 8/1977 | Atkinson | 312/102 |
| D268,996 S | * | 5/1983 | Elleby et al. | D11/145 |
| 4,636,105 A | * | 1/1987 | Johansson | 285/424 |
| D303,457 S | * | 9/1989 | Stewart | D6/300 |
| D317,400 S | * | 6/1991 | Loew | D8/382 |
| D320,952 S | * | 10/1991 | Lang | D11/145 |
| 5,400,557 A | * | 3/1995 | Glover | 49/339 |

FOREIGN PATENT DOCUMENTS

JP     411210324    *   8/1999     ............. E06B/1/32

* cited by examiner

*Primary Examiner*—Charles T. Jordan
*Assistant Examiner*—Francis T. Palo
(74) *Attorney, Agent, or Firm*—George W. Wasson

(57) ABSTRACT

A window greenhouse with contoured surfaces comprising a pair of gable frames interconnected by beams including a contoured knee member and a contoured front sill member. Dovetail slots are provided in the gable frames for receiving contoured corner plugs. Gable frames also include channels for attachment of contoured covers. The elements of the window greenhouse are arranged such that the contoured surfaces thereof are flush with each other.

2 Claims, 8 Drawing Sheets

FIG_1

WINDOW GREENHOUSE WITH CONTOURED SURFACES

CROSS-REFERENCE TO RELATED APPLICATIONS

This application claims the benefit of U.S. Provisional Application No. 60/207,888, filed May 25, 2000.

BACKGROUND

Even though window-greenhouse structures with contoured surfaces are known in the art, common disadvantages associated with existing designs include high cost of manufacturing, difficulty of assembly, and inferior fit and finish of the contoured surfaces of the window.

Hence, a need exists for a window greenhouse that can be produced inexpensively, assembled easily, and will provide improved fit between the contoured surfaces of the window.

SUMMARY

A window greenhouse that includes a plurality of contoured surfaces disposed flush with each other is disclosed. In one embodiment of the invention, the window greenhouse includes a pair of gable frames interconnected by structural members including a contoured knee member and a contoured front sill member. The gable frames have a plurality of corner slots for receiving a plurality of contoured corner plugs. A plurality of contoured covers is attached to the gable frames.

These and other features, aspects, and advantages of the window greenhouse in its various embodiments will become apparent after consideration of the ensuing description, the accompanying drawings, and the appended claims.

BRIEF DESCRIPTION OF THE DRAWINGS

The window greenhouse in its various embodiments is illustrated by way of example, and not by way of limitation, in the figures of the accompanying drawings, where.

For purposes of illustration, these figures are not necessarily drawn to scale. In all of the figures, like components are designated by like reference numerals.

Figure 1:
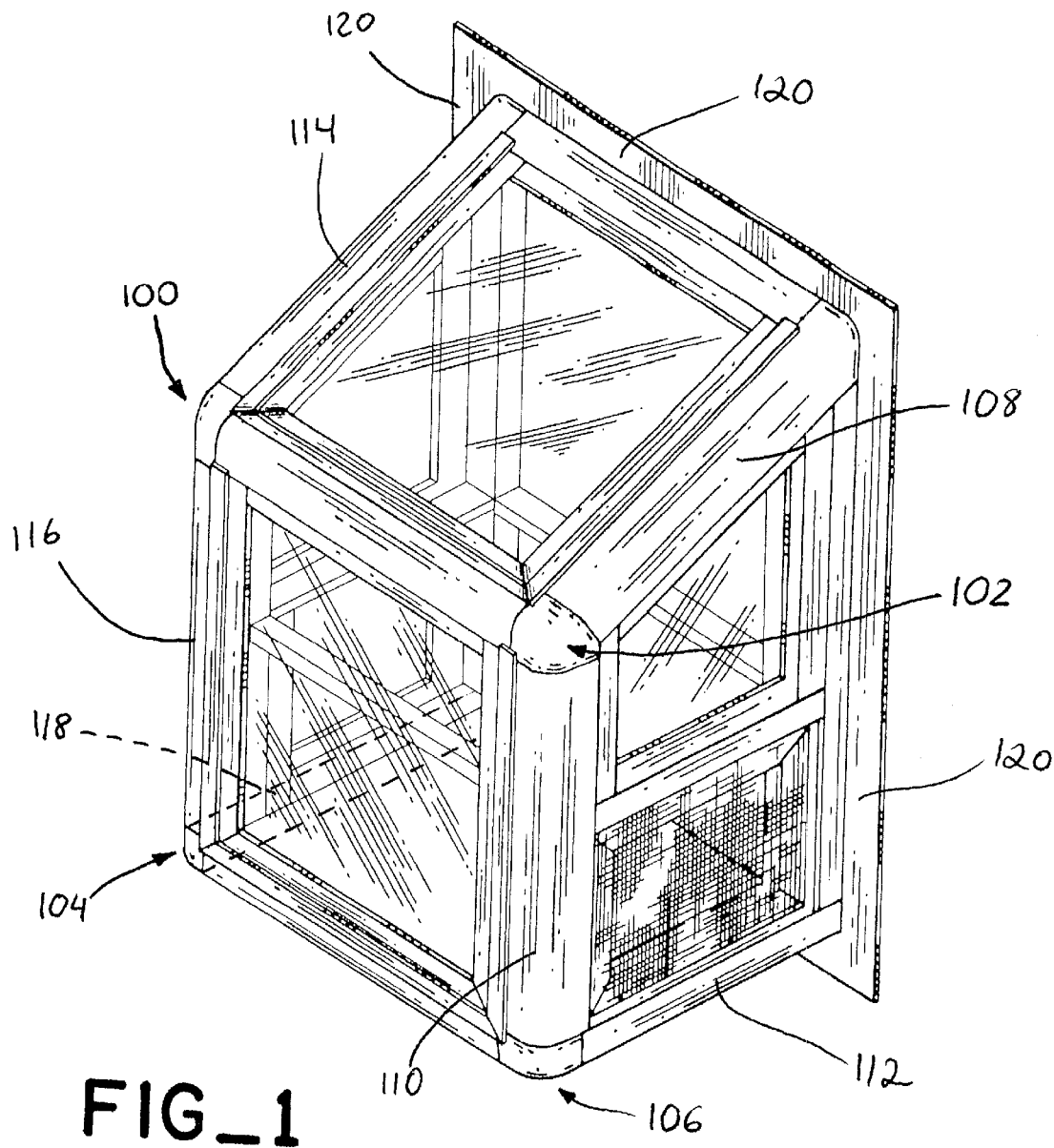
FIG. 1 is a perspective view of the window greenhouse in accordance with one embodiment of the present invention.

LIST OF REFERENCE NUMERALS 100, 102—contoured knee plugs
104, 106—contoured sill plugs
108, 110, 112, 114, 116, and 118—contoured snap-in covers
120—nailing fins
122, 124—gable frames
126—contoured front sill member
128—rear sill member
130—contoured knee member
132—head member
133, 142—screws
134, 138—knee slots
136, 140—sill slots
144—head portion
146, 150—contoured surfaces
148—body portion
152, 158, 160—locating tabs
154, 156—anchor arms
162, 164, 166, and 168—openings
170—channels
172—tenon projections
174—mortise
176—shrouds
178—flanges
180—mounting projections
182—snaps
184—shrouds
186—flanges
188—contoured surface
190—adjoining surfaces

DETAILED DESCRIPTION

Throughout the following description, specific details are set forth in order to provide a more thorough understanding of the invention. However, the invention may be practiced without these particulars. In other instances, well known elements have not been shown or described to avoid unnecessarily obscuring the invention. Accordingly, the specification and drawings are to be regarded in an illustrative, rather than a restrictive, sense.

FIG. 1 is a perspective view of the window greenhouse with contoured surfaces according to one embodiment of the present invention. The window greenhouse includes a plurality of corner plugs, namely contoured knee plugs 100 and 102, as well as contoured sill plugs 104 and 106. The window greenhouse further comprises contoured snap-in covers 108, 110, 112, 114, 116, and 118. The specifics of the above-mentioned elements will be described in detail below. The window greenhouse is attached to a dwelling structure (not shown) using nailing fins 120.

Figure 2:
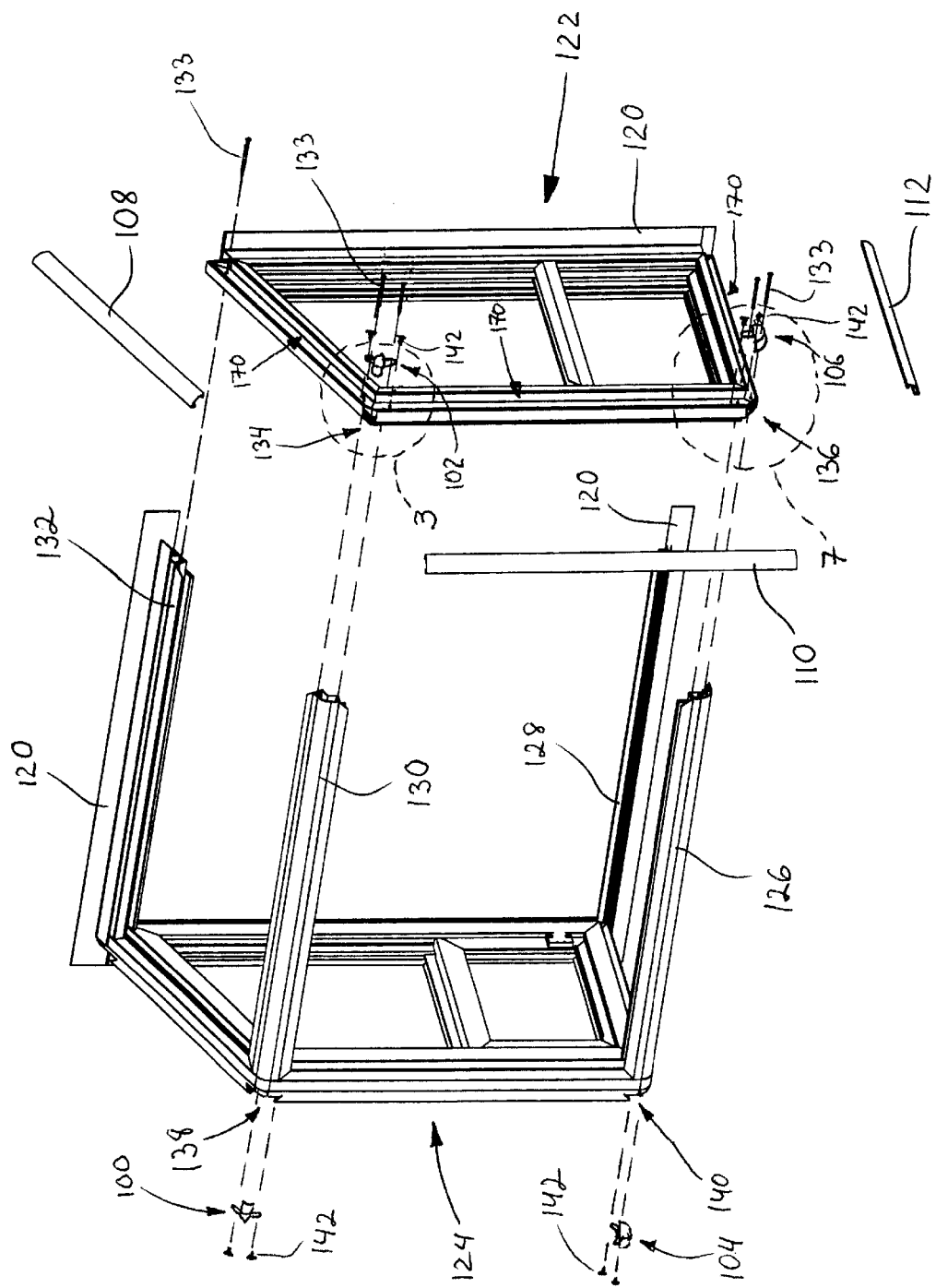
FIG. 2 is an exploded perspective view of the window greenhouse of FIG. 1.

FIG. 2 is an exploded perspective view of the window greenhouse of FIG. 1. The window greenhouse comprises gable frames 122 and 124, connected by a contoured front sill member 126, a rear sill member 128, contoured knee member 130, and a head member 132. Members 126–132 are attached to the gable frames with conventional fasteners, such as screws 133. Gable frame 122 includes a knee slot 134 and a sill slot 136 for receiving knee plug 102 and sill plug 106, respectively. Gable frame 124 includes a knee slot 138 and a sill slot 140 for receiving knee plug 100 and sill plug 104, respectively. Once plugs 100–106 are mounted in their respective slots, the plugs may be additionally secured with conventional fasteners, e.g., screws 142.

Figure 3:
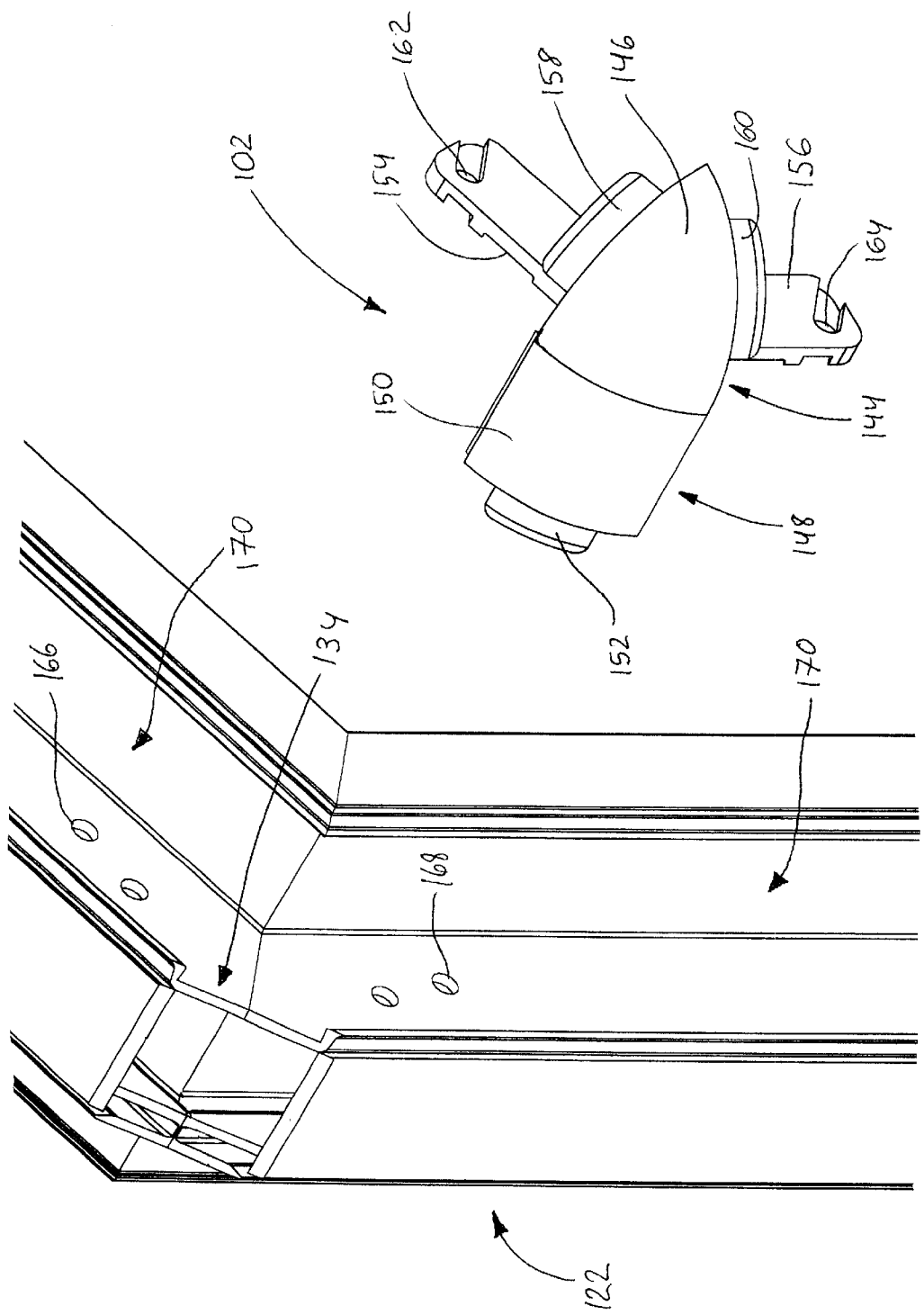
FIG. 3 is an enlarged view of detail 3 of FIG. 2.

The details of a corner plug and its corresponding mounting slot, e.g., knee plug 102 and knee slot 138, are discussed with reference to FIGS. 3 and 4. Those skilled in the art will appreciate that knee plugs 100, 102 and their corresponding mounting slots 138, 134 are substantially similar to sill plugs 104, 106 and their corresponding mounting slots 140, 136. As shown in FIG. 3, each corner plug, e.g., knee plug 102, comprises a head portion 144, having a contoured surface 146, and a body portion 148, having a contoured surface 150 continuous with surface 146. The curvature of surface 146 is substantially spherical, whereas the curvature of surface 150 is substantially cylindrical. Body portion 148 includes a curved locating tab 152 as well as anchor arms 154 and 156. Extending from head portion 144 are curved locating tabs 158 and 160. Locating tabs 152, 158, and 160 of plug 102 are configured to mate with contoured snap-in covers 108 and 110 (shown in FIG. 2), as well as with contoured knee member 130 (shown in FIG. 2), to ensure that the contoured surfaces of the corner plug, snap-in covers, and the knee member are flush with each other. Those skilled in the art will appreciate that the use of locating tabs may be omitted if desired. Anchor arms 154 and 156 include openings 162 and 164, respectively, provided for attachment of the corner plug to gable frame 122 with the use of conventional fasteners (shown in FIG. 2), received into corresponding openings 166 and 168 of the gable frame. As illustrated in FIG. 3, each gable frame includes channels 170 provided to accommodate snap-in covers 108–118, as discussed in detail below with reference to FIG. 6.

Figure 4:
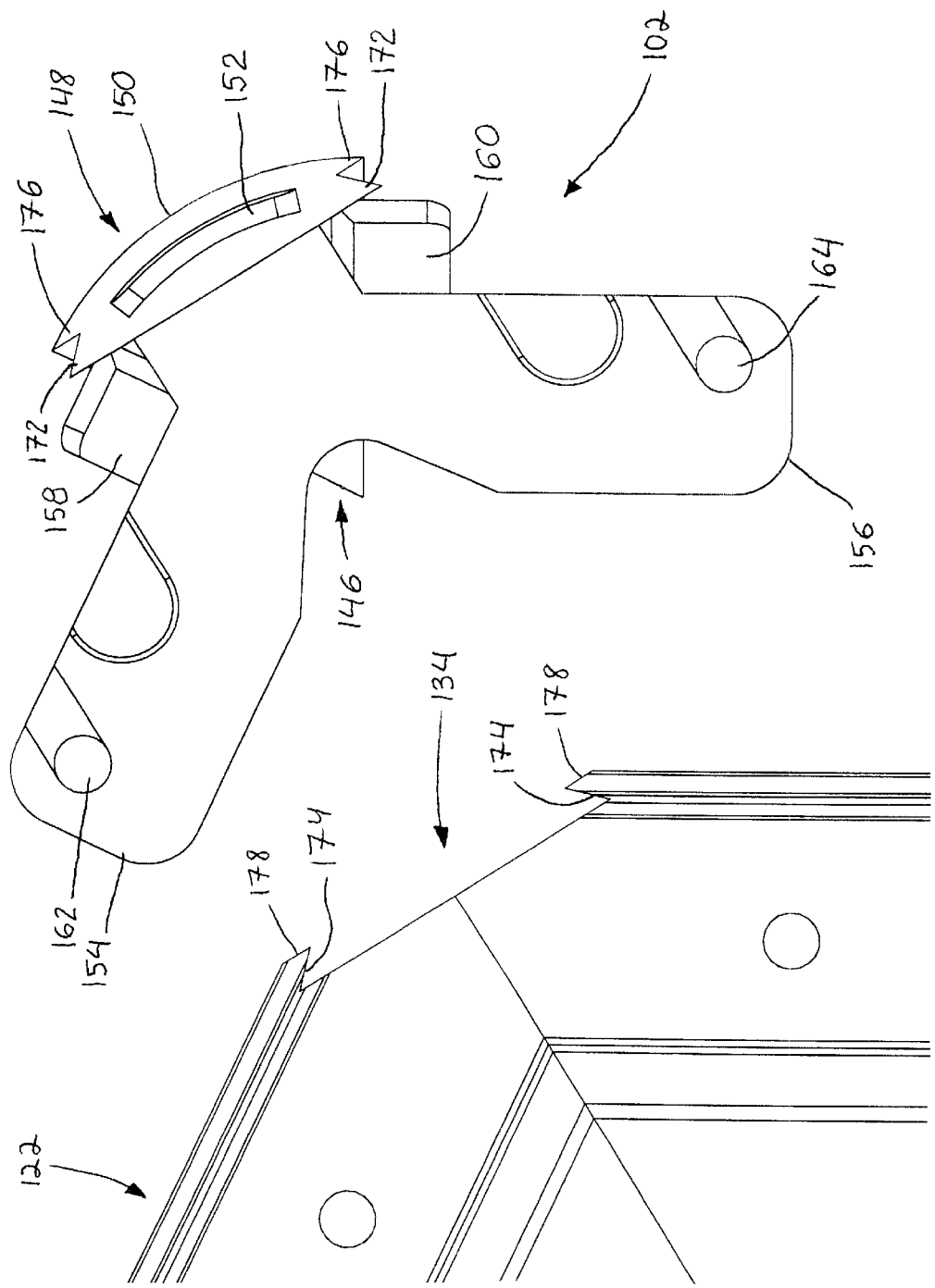
FIG. 4 is a side view of the detail shown in FIG. 3.
Figure 5:
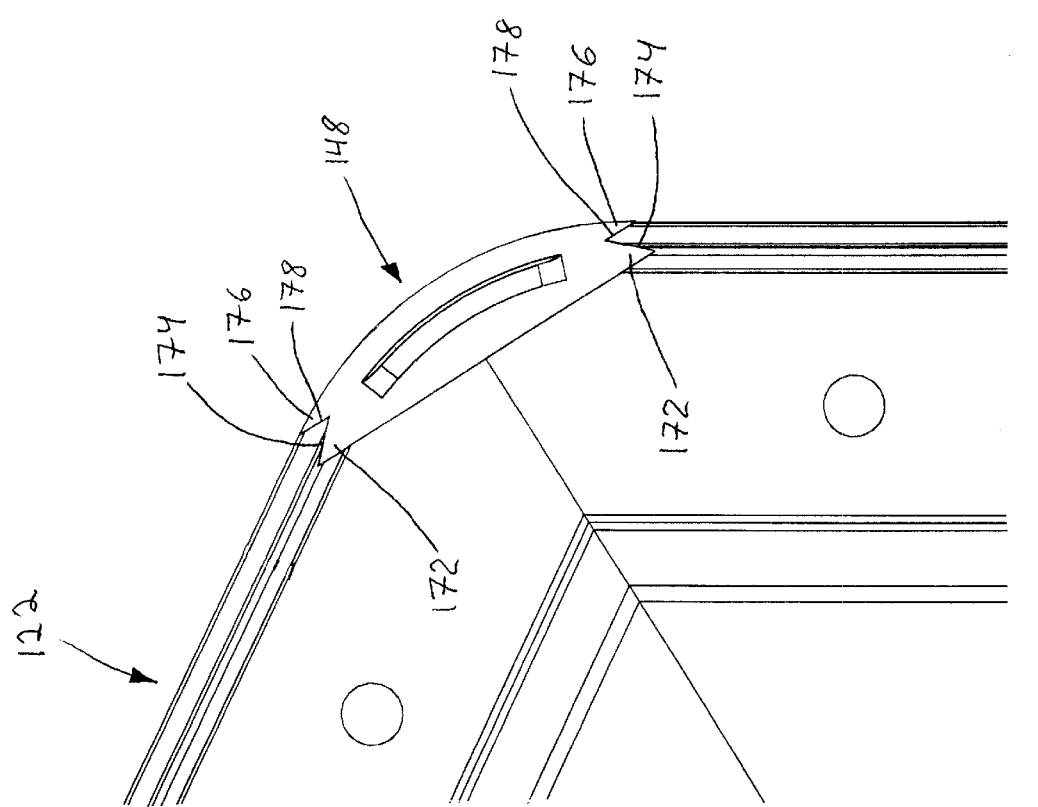
FIG. 5 is the detail shown in FIG. 4 after assembly.

FIG. 4 is a side view of the gable frame and corner plug of FIG. 3 provided to illustrate the details of the mounting arrangement of the corner plugs in their corresponding slots. As shown in FIG. 4, knee plug 102 includes tenon projections 172, integral with body portion 148. The tenon projections of the corner plug dovetail into a mortise 174 formed in knee slot 134, comprising an interlocking joint therewith, as shown in FIG. 5. Referring to FIGS. 4 and 5, body portion 148 of the corner plug also includes shrouds 176, provided to conceal the interlocking joint between tenon projections 172 and mortise 174. Shrouds 176 mate with flanges 178, formed along mortise 174.

Figure 6:
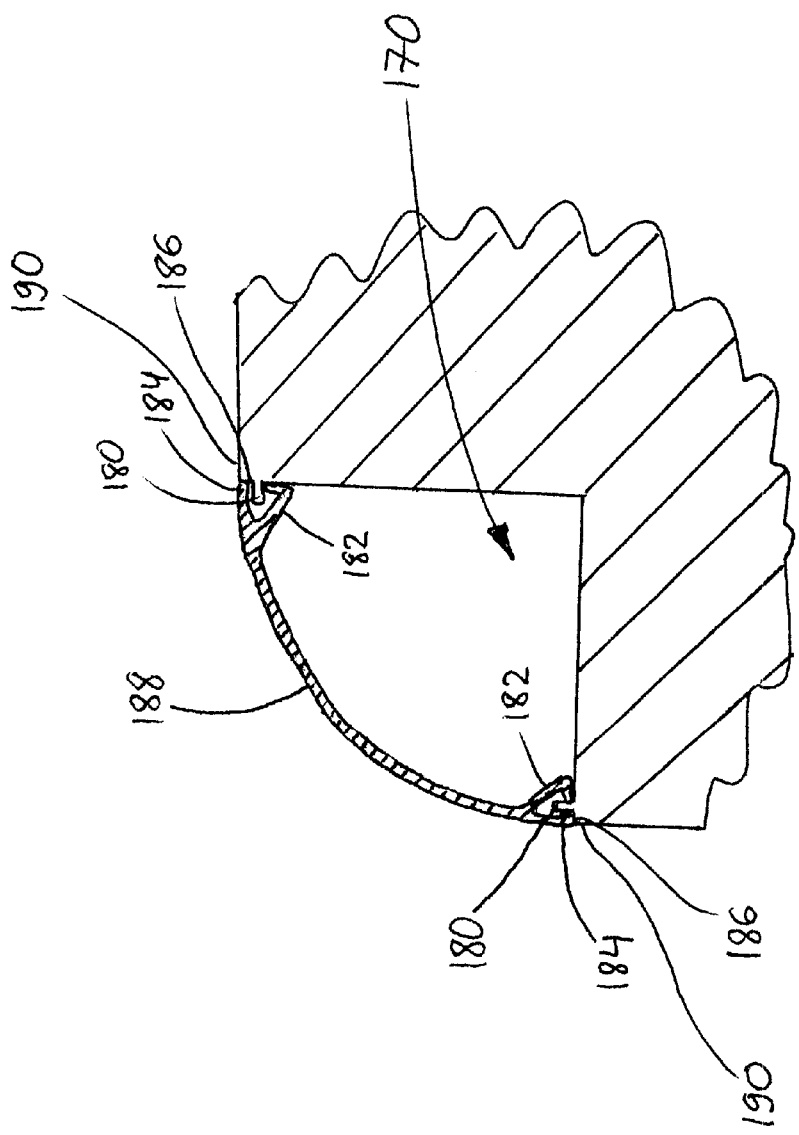
FIG. 6 is a partial cross-sectional view of the gable frame shown in FIG. 2.

FIG. 6 is a cross-sectional view of a gable frame illustrating one of channels 170 provided for attachment of contoured snap-in covers 108–118 to the gable frames. Each channel 170 includes longitudinally-positioned mounting projections 180 adapted to be demountably engaged by snaps 182, formed on the interior of each snap-in cover. Each snap-in cover further includes shrouds 184 adapted for mating with flanges 186 of channels 170 to conceal the interlocking joint of snaps 182 with projections 180 and to ensure that a contoured surface 188 of each snap-in cover is flush with the adjoining surfaces 190 of the gable frame.

Figure 7:
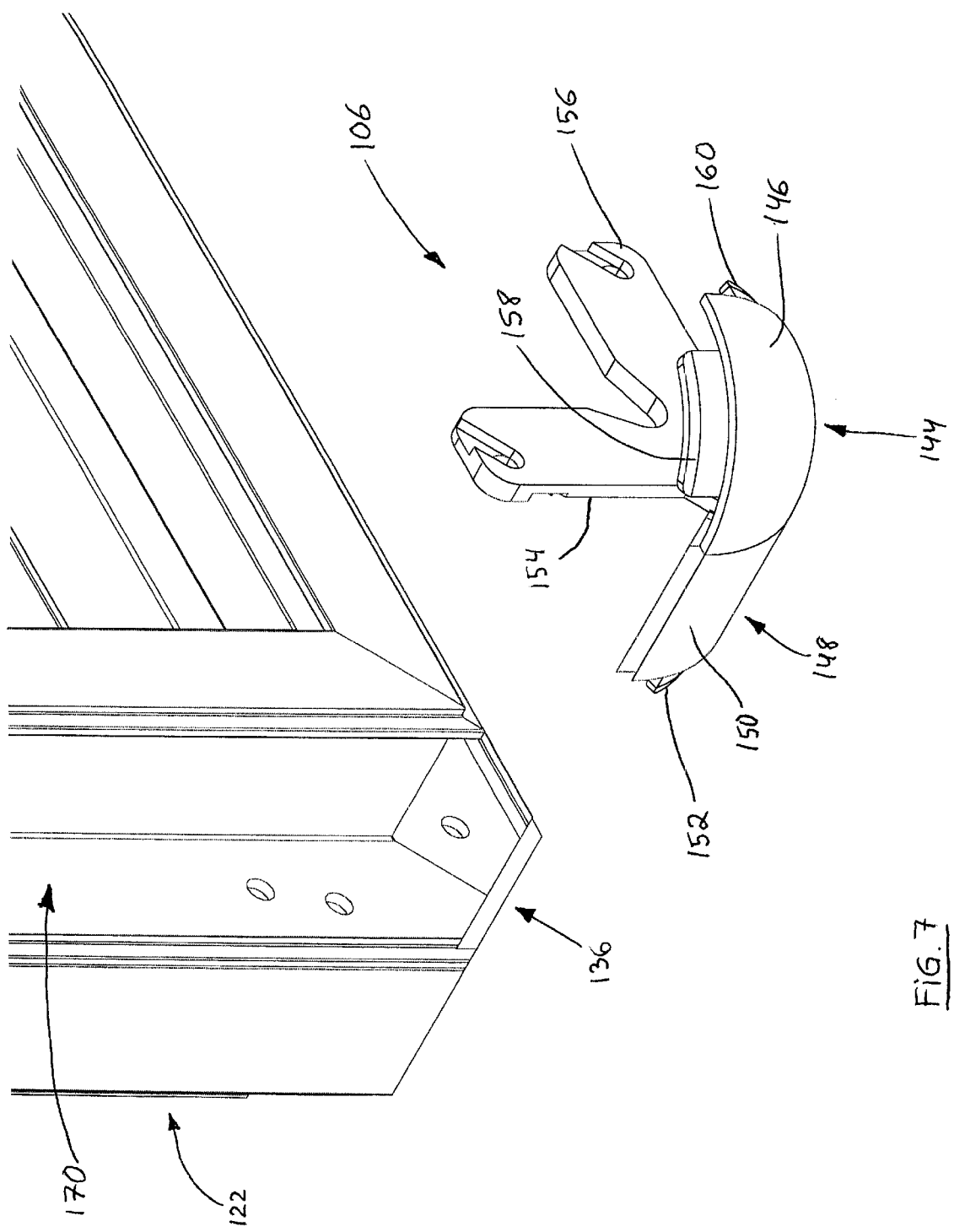
FIG. 7 is an enlarged view of detail 7 of FIG. 2.

FIG. 7 illustrates sill plug 106 and its corresponding sill slot 136. Those skilled in the art will appreciate that the configuration of sill plug 106 is essentially the same as that of the knee plug described with reference to FIGS. 3 and 4, and hence like reference numerals are used to indicate like components. The only substantial difference between the sill plugs and the knee plugs is that anchor arms 154 and 156 of the sill plugs define a different angle than those of the knee plugs. This is due to the difference in angles at the knee joints as compared to the sill joints of the gable frames.

The assembly and installation of the window greenhouse according to the above-described embodiment of the invention may be illustrated with reference to FIG. 2. Initially, nailing fins 120 are attached to gable frames 122 and 124, rear sill member 128, and head member 132 in a manner illustrated in the drawing. The gable frames are then interconnected using members 126–132, at which point corner plugs 100–106 are mounted in their respective corner slots 136–140 and fastened to the gable frames. Once covers 108–118 are installed in channels 170, the window greenhouse may be attached to the building structure (not shown) using nailing fins 120.

Figure 8:
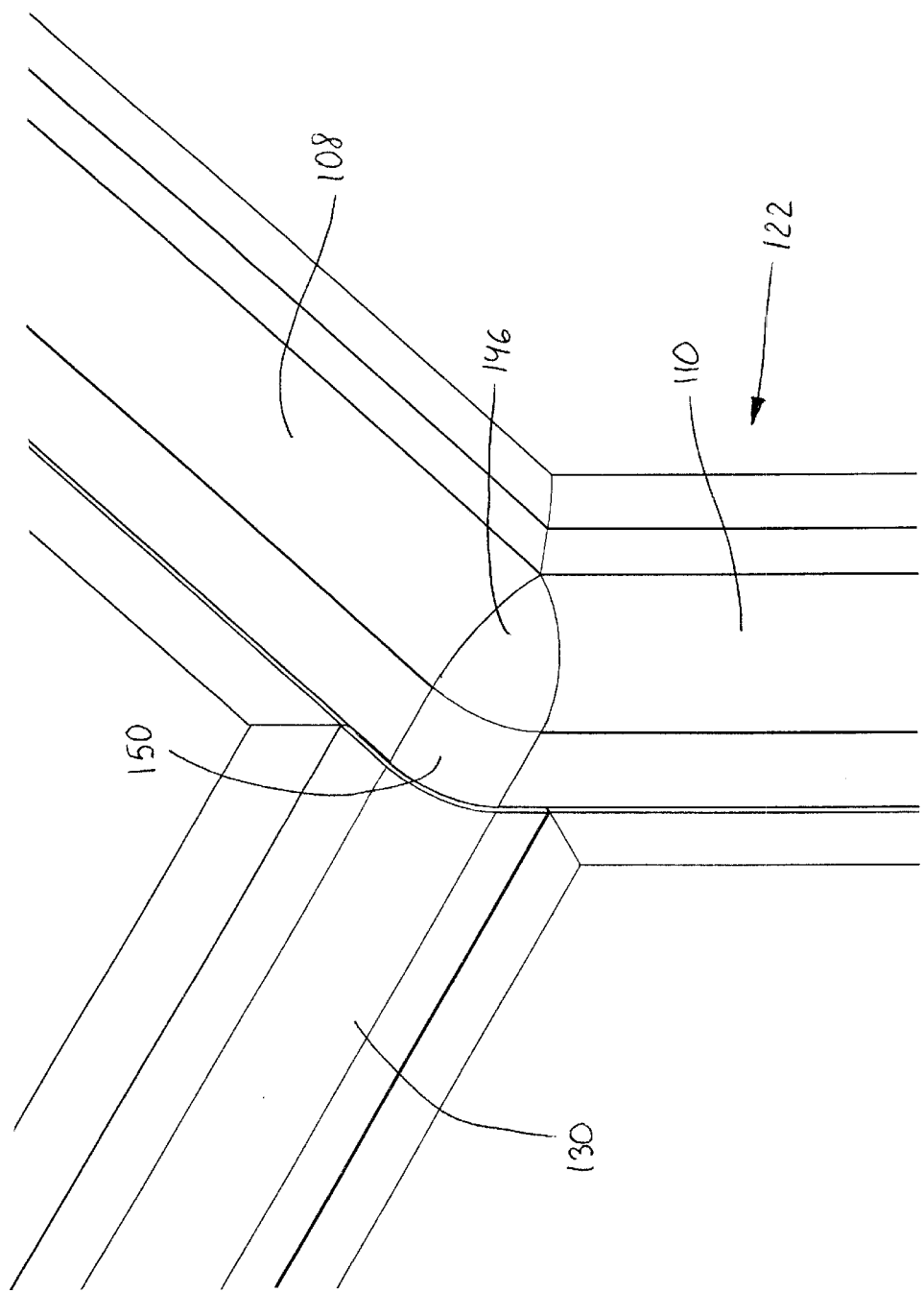
FIG. 8 is a perspective view of an integrated junction of the window greenhouse of FIG. 2.

FIG. 8 is a perspective view of an integrated junction between one of the gable frames, e.g., gable frame 122 and one of the contoured members, e.g., knee member 130. It is apparent from FIG. 8 that contoured surfaces of knee member 130, knee plug 102, and snap-in covers 108 and 110 are flush with each other and the adjoining surfaces of the gable frame.

Those skilled in the art will appreciate that the components of the window greenhouse according to the above-described embodiment of the invention, including the gable frames, corner plugs, head member, knee member, sill members, and snap-in covers may be made of various type of plastic, e.g., polyvinyl chloride (PVC).

The above-described embodiment of the window greenhouse is given only as an example. Therefore, the scope of the invention should be determined not by the illustrations given, but by the appended claims and their equivalents.

The invention claimed is:

1. A window greenhouse comprising:
a first gable frame having a first knee slot and a first sill slot;
a second gable frame having a second knee slot and a second sill slot;
a head member, a knee member, a front sill member, and a rear sill member connecting said first and second gable frames;
a first, a second, and a third cover attached to said first gable frame;
a fourth, a fifth, and a sixth cover attached to said second gable frame;
a first knee plug mounted in said first knee slot and a second knee plug mounted in said second knee slot; and
a first sill plug mounted in said first sill slot and a second sill plug mounted in said second sill slot;
said covers, said knee member, said front sill member, said knee plugs, and said sill plugs have contoured surfaces, the contoured surfaces of said first knee plug disposed flush with the contoured surfaces of said knee member and of said first and second covers, the contoured surfaces of said second knee plug disposed flush with the contoured surfaces of said knee member and of said fourth and fifth covers, the contoured surfaces of said knee member and of said fourth and fifth covers, the contoured surfaces of said first sill plug disposed flush with the contoured surfaces of said front sill member and of said second and third covers, the contoured surfaces of said second sill plug disposed flush with the contoured surfaces of said front sill member and of said fifth and sixth covers;
each of said knee slots and sill slots including a mortise and flanges formed along said mortise;
each of said knee and sill plugs including:
a head portion having a substantially-spherical surface;
a body portion having a substantially-cylindrical surface, said substantially-spherical surface continuous with said substantially-cylindrical surface;
tenon projections integral with said body portion, said tenon projections when engaged with said motise forming an interlocking joint; and
at least one anchor arm extending from said body portion;
said at least one anchor arm being attached to one of said gable frames;
each of said tenon projections and motices of said knee and sill plugs further including shrouding means for concealing said interlocking joint, said shrouding means adapted to mate with said flanges; and
each of said knee and sill plugs further including:
a locating tab extending from said body portion; and
a pair of locating tabs extending from said head portion.

2. The window greenhouse of claim 1 further including a plurality of nailing fins attached to said gable frames, said head member, and said rear sill member.

* * * * *